United States Patent
Falconer et al.

(10) Patent No.: US 7,316,727 B2
(45) Date of Patent: Jan. 8, 2008

(54) HIGH-SELECTIVITY SUPPORTED SAPO MEMBRANES

(75) Inventors: John L. Falconer, Boulder, CO (US);
Shiguang Li, Boulder, CO (US);
Richard D. Noble, Boulder, CO (US)

(73) Assignee: The Regents of The University of Colorado, Boulder, CO (US)

( * ) Notice: Subject to any disclaimer, the term of this patent is extended or adjusted under 35 U.S.C. 154(b) by 263 days.

(21) Appl. No.: 10/805,183

(22) Filed: Mar. 19, 2004

(65) Prior Publication Data

US 2005/0204916 A1 Sep. 22, 2005

(51) Int. Cl.
*B01D 53/22* (2006.01)
(52) U.S. Cl. .................. 95/51; 95/43; 96/4; 96/10; 96/11; 427/426; 427/372.2; 427/430.1; 427/435
(58) Field of Classification Search ............... 427/245, 427/246, 372.2, 430.1, 435, 443.2; 96/4, 96/10, 11; 95/43, 51
See application file for complete search history.

(56) References Cited

U.S. PATENT DOCUMENTS

| | | | |
|---|---|---|---|
| 4,440,871 A | 4/1984 | Lok et al. | |
| 5,100,596 A | 3/1992 | Haag et al. | |
| 5,362,522 A * | 11/1994 | Barri et al. | 427/435 |
| 5,464,798 A | 11/1995 | Jia et al. | |
| 5,567,664 A | 10/1996 | Barri et al. | |
| 5,779,904 A | 7/1998 | Ruderman et al. | |
| 5,824,617 A | 10/1998 | Lai | |
| 5,830,429 A * | 11/1998 | Balkus et al. | 423/702 |
| 5,871,650 A * | 2/1999 | Lai et al. | 96/11 |
| 6,074,457 A | 6/2000 | Anthonis et al. | |
| 6,090,289 A * | 7/2000 | Verduijn et al. | 96/11 |
| 6,140,263 A | 10/2000 | Anstett et al. | |
| 6,193,784 B1 | 2/2001 | Yazawa et al. | |
| 6,472,016 B1 * | 10/2002 | Soria et al. | 96/11 |
| 6,503,294 B2 * | 1/2003 | Yoshikawa et al. | 96/11 |
| 6,767,384 B1 | 7/2004 | Vu et al. | |

FOREIGN PATENT DOCUMENTS

| | | |
|---|---|---|
| CN | 1167005 | 12/1997 |
| WO | WO 94/25152 | 11/1994 |
| WO | WO 02/074421 | 9/2002 |
| WO | WO 03/048042 | 6/2003 |

OTHER PUBLICATIONS

Poshuta, Joseph C., "Separation of Light Gas Mixtures Using SAPO-34 Membranes", AIChE Journal, Apr. 2000, vol. 46, No. 4, pp. 779-789, especially 780-781.*

(Continued)

*Primary Examiner*—Jason M. Greene
(74) *Attorney, Agent, or Firm*—Greenlee, Winner and Sullivan, P.C.

(57) ABSTRACT

SAPO membranes and methods for their preparation and use are described. The SAPO membranes are prepared by contacting at least one surface of a porous membrane support with an aged synthesis gel. A layer of SAPO crystals is formed on at least one surface of the support. SAPO crystals may also form in the pores of the support. SAPO-34 membranes of the invention can have improved selectivity for certain gas mixtures, including mixtures of carbon dioxide and methane.

37 Claims, 16 Drawing Sheets

OTHER PUBLICATIONS

Dyer, A. (1988), *An Introduction to Zeolite Molecular Sieves*, John Wiley & Sons, New York, pp. 1-3, 12-15, 20-25, 36-37, 54, 57.

Gump, C. et al. (2001), "Aromatic Permeation through Crystalline Molecular Sieve Membranes," Ind. Eng. Chem. Res. 40(2):565-577.

Hedlund, J. et al. (2002), "High-flux MFI membranes," Micro. and Meso. Mater. 52:179-189.

Jhung, S-H. et al. (Oct. 2003), "Selective formation of SAPO-5 and SAPO-34 molecular sieves with microwave irradiation and hydrothermal heating," Micro. and Meso. Mater. 64:33-39.

Kärger, J. and Ruthven, J. (1992), *Diffusion in Zeolites*, John Wiley and Sons: New York, pp. 9-10.

Keizer et al. (1998), "Two component permeation through thin zeolite MFI membranes," J. Memb. Sci. 147:159-172.

Li, S. et al. (Available on-line Jul. 24, 2004), "SAPO-34 membranes for $CO_2/CH_4$ separation," J. Membrane Sci. 241:121-135.

Li, S. et al. (Available on-line Dec. 2004), "Effects of impurities on $CO_2/CH_4$ separations through SAPO-34 membranes," J. Membrane Sci., pp. 59-66.

Lixiong et al. (1997), "Synthesis of SAPO-34/ceramic composite membranes," Stud. Surf. Sci. Catal. 105:2211.

Mériaudeau, P. et al. (1997), "SAPO-11, SAPO-31, and SAPO-41 Molecular Sieves: Synthesis, Characterization, and Catalytic Properties in *n*-Octane Hydroisomerization," J. Catal. 169:55-66.

Poshusta et al. (1998), "Synthesis and Permeation Properties of SAPO-34 Tubular Membranes," Ind. Eng. Chem. Res. 37:3924-3929.

Poshusta et al. (2000), "Separation of Light Gas Mixtures Using SAPO-34 Membranes," AIChE J. 46(4):779-789.

Poshusta, J.C. et al. (2001), "Characterization of SAPO-34 membranes by water adsorption," J. Membrane Science 186:25-40.

Prakash, A.M. and Unnikrishnan, S. (1994), "Synthesis of SAPO-34: High Silicon Incorporation in the Presence of Morpholine as Template," J. Chem. Soc. Faraday Trans. 90(15):2291-2296.

Recipe for SAPO-34, hppt://www.iza-synthesis.org/Recipes/SAPO-34.html, accessed Jan. 15, 2004.

Sano, T. et al. (1992), "Synthesis and characterization of polycrystalline SAPO-5 film," J. Mol. Catal. 77:L19-L26.

Szostak, R. (1998), "Synthesis of Molecular Sieve Phosphates," in "Recent Advances in the Understanding of Zeolit Synthesis," in *Molecular Sieves, Science and Technology*, Karge, H.G. and Weitkamp, J., eds., Springer-Verlag, Berlin, pp. 161-165.

Thompson, R.W. (1998) "Recent Advances in the Understanding of Zeolite Synthesis," in *Molecular Sieves, Science and Technology*, Karge, H.G. and Weitkamp, J., eds., Springer-Verlag, Berlin, pp. 19-31.

Tsai, T.-G. et al. (1998), "Well-aligned SAPO-5 membrane: preparation and characterization," Micropor. Mesopor. 22:333-341.

Kang et al. (2002) "Intrapore Synthesis of Silicalite Membranes at Temperatures Below 100° C.," *Ind. Eng. Chem. Res.* 41:3145-3150.

Supplementary European Search Report corresponding to European application No. EP 05 72 5632, completed on May 4, 2007.

\* cited by examiner

HIGH-SELECTIVITY SUPPORTED SAPO MEMBRANES

BACKGROUND OF THE INVENTION

This invention is in the field of silicoaluminophosphate (SAPO) membranes, in particular SAPO membranes prepared on a porous support. The invention provides supported SAPO membranes as well as methods for making and using them.

SAPOs are largely composed of Si, Al, P and O and can have a three-dimensional microporous crystal framework structure of $PO_2^+$, $AlO_2^-$ and $SiO_2$ tetrahedral units. The cages, channels and cavities created by the crystal framework can permit separation of mixtures of molecules based on their effective sizes.

SAPO crystals can be synthesized by hydrothermal crystallization from a reaction mixture containing reactive sources of silica, alumina, and phosphate, and an organic templating agent. Lok et al. (U.S. Pat. No. 4,440,871) report gel compositions and procedures for forming several types of SAPO crystals, including SAPO-5, SAPO-11, SAPO-16, SAPO-17, SAPO-20, SAPO-31, SAPO-34, SAPO-35, SAPO-37, SAPO-40, SAPO 41, SAPO-42, and SAPO-44 crystals. Lok et al. do not appear to disclose formation of SAPO membranes. Mériaudeu et al. (Mériaudeau, P. et al., J. Catalysis, 1997, 169, 55-66) report gel compositions and procedures for forming SAPO-11, SAPO-31, and SAPO-41 crystals. Mériaudeu et al. do not appear to disclose formation of SAPO membranes. Prakash and Unnikrishnan report gel compositions and procedures for forming SAPO-34 crystals. (Prakash, A. M. and Unnikrishnan, S., J. Chem. Sc. Faraday Trans., 1994, 90 (15), 2291-2296). In several of Prakash and Unnikrishnan's reported procedures, the gel was aged for 24 hours at 27° C. (300 K). Prakash and Unnikrishnan do not appear to disclose formation of SAPO-34 membranes.

SAPO membranes have been proposed for use in gas separations. For these applications, an important parameter is the separation selectivity. For two gas components i and j, a separation selectivity $S_{i/j}$ greater than one implies that the membrane is selectively permeable to component i. If a feedstream containing both components is applied to one side of the membrane, the permeate stream exiting the other side of the membrane will be enriched in component i and depleted in component j. The greater the separation selectivity, the greater the enrichment of the permeate stream in component i.

Barri et al. report supported zeolite membranes (U.S. Pat. No. 5,567,664) and methods for the production of zeolite membranes on porous supports (U.S. Pat. No. 5,362,522). Barri et al. state that any type of zeolite-type material may be used, including silicoaluminophosphates.

SAPO-5 and SAPO-11 membranes have been reported in the scientific literature. Sano et al. (Sano, T. et al., J. Mol. Cat. 1992, 77, L12) reported hydrothermal synthesis of SAPO-5 membranes on a Teflon slab. Sano et al. reported aging of the hydrogel overnight at room temperature before heating the substrate and gel. Tsai et al. (Tsai, T. G. et al., Micropor. Mesopor. Mat. 1998, 22, 333) reported synthesis of SAPO-5 membranes on anodic alumina supports using a microwave hydrothermal synthesis technique. Gump et al. (Gump, C. et al, Ind. Engr. Chem. Res, 2001, 40 (2), 565-577) reported hydrothermal synthesis of SAPO-5 and SAPO-11 membranes on the inner surface of α-alumina tubes with 200 nm pores.

SAPO-34 membranes on porous supports have been reported in the scientific literature. Lixiong et al. (Stud. Surf. Sci. Catl., 1997, 105, p 2211) reported synthesis of a SAPO-34 membrane on one side of a porous $\alpha$-$Al_2O_3$ disk by immersing the substrate surface in a hydrogel and heating the substrate and gel. Lixiong et al. reported single gas permeances for $H_2$, $N_2$, $CO_2$, and n-$C_4H_{10}$. Poshuta et al. (Ind. Eng. Chem. Res., 1998, 37, 3924-3929; AlChE Journal, 2000, 46 (4), 779-789) reported hydrothermal synthesis of SAPO-34 membranes on the inside surface of asymmetric, porous $\alpha$-$Al_2O_3$ tubes. Poshuta et al. (supra) reported single gas and mixture permeances and ideal and mixture selectivities for several gases, including $CO_2$ and $CH_4$. The $CO_2/CH_4$ selectivities reported for a 50/50 $CO_2/CH_4$ mixture at 300 K were between 14 and 36 for a feed pressure of 270 kPa and a pressure drop of 138 kPa (Poshusta et al., AlChE Journal, 2000, 46 (4), pp 779-789). The $CO_2/CH_4$ selectivity was attributed to both competitive absorption (at lower temperatures) and differences in diffusivity.

There remains a need in the art for improved methods for making SAPO membranes, in particular SAPO membranes with improved separation selectivities.

BRIEF SUMMARY OF THE INVENTION

In an embodiment, the invention provides methods for making crystalline silicoaluminophosphate (SAPO) membranes on a porous support, in particular SAPO-34 membranes. Inorganic membranes such as SAPOs can have superior thermal, mechanical and chemical stability, good erosion resistance, and high pressure stability as compared to conventional polymeric membranes.

The methods of the invention are capable of producing SAPO-34 membranes with improved $CO_2/CH_4$ selectivities as compared to separation selectivities previously reported for SAPO-34 membranes. In addition, the SAPO-34 membranes of the invention can have good $CO_2/CH_4$ separation selectivities for trans-membrane pressure drops in excess of 1 MPa. The separation of $CO_2$ from $CH_4$ is important in natural gas processing because $CO_2$ reduces the energy content of natural gas.

In an embodiment, the invention provides a method for making a crystalline SAPO membrane comprising the steps of:
  a) providing a porous support having a pore size greater than about 0.2 micron;
  b) preparing an aqueous SAPO-forming gel comprising an organic templating agent;
  c) aging the gel;
  d) contacting the support with the aged gel;
  e) heating the support and the aged gel to form a layer of SAPO crystals at least in part of the surface of the support; and
  f) calcining the SAPO layer to remove the template.

The invention also provides supported SAPO membranes. In an embodiment, the invention provides a supported membrane comprising a porous support and SAPO crystals which are present within at least some of the pores of the support and which form a layer on at least one side of the support, wherein the pore size of the support is greater than about 0.2 microns. In another embodiment, the porous support is in the form of a tube and the SAPO crystals are present throughout the thickness of the tube and form layers on both the inside and the outside of the tube.

The invention also provides methods for separating a first gas component from a gas mixture including at least a first and a second gas component. In an embodiment, the method comprises the steps of:
  a) providing a membrane of the invention, the membrane having a feed and a permeate side and being selectively permeable to the first gas component over the second gas component;
  b) applying a feedstream including the first and the second gas components to the feed side of the membrane;
  c) providing a driving force sufficient for permeation of the first gas component through the membrane, thereby producing a permeate stream enriched in the first gas component from the permeate side of the membrane.

In an embodiment, the membrane is a SAPO-34 membrane, the first gas component is carbon dioxide and the second gas component is methane.

DETAILED DESCRIPTION OF THE INVENTION

Figure 1:
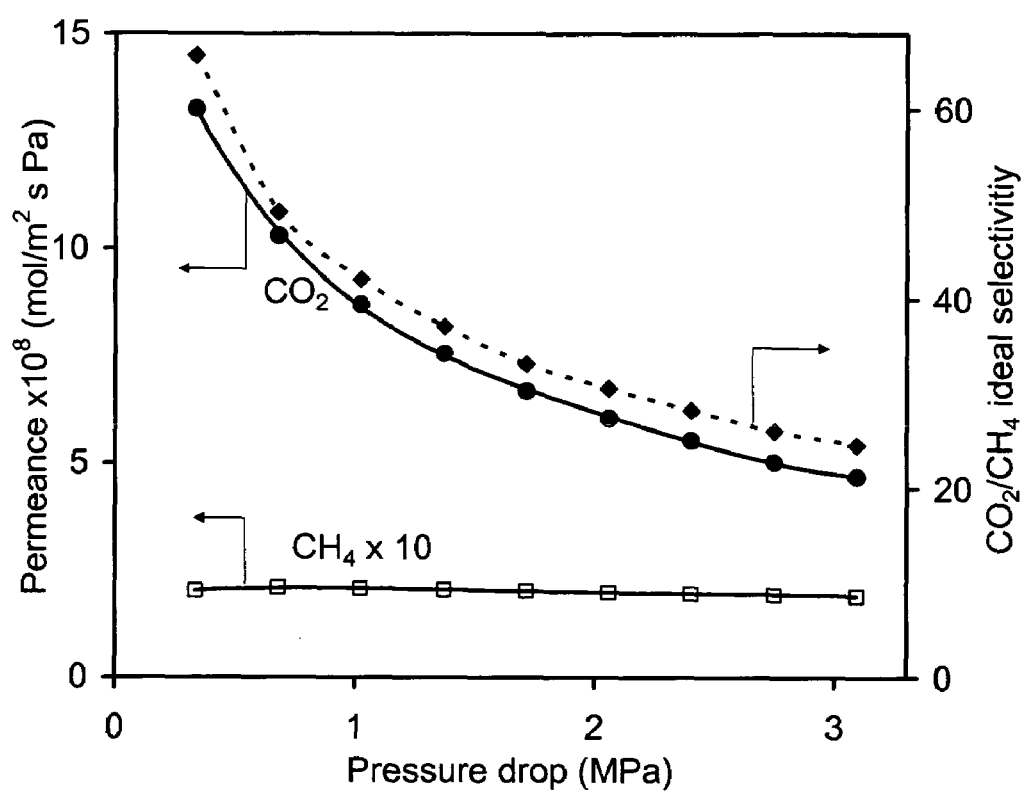
FIG. 1 shows single gas permeances for $CO_2$ and $CH_4$ and $CO_2/CH_4$ ideal selectivity as a function of pressure drop for a SAPO-34 membrane at 297 K. The permeate pressure was 125 kPa.

In an embodiment, the methods of the invention provide silicoaluminophosphate (SAPO) membranes formed of SAPO crystals. SAPOs are zeolite-type molecular sieve materials, having a crystal structure of tetrahedra joined together through oxygen atoms to produce an extended network of channels of molecular dimensions. The SAPO crystals have a three-dimensional crystal framework structure of $PO_2^+$, $AlO_2^-$ and $SiO_2$ tetrahedral units, the framework structure defining a structure of regular cages, cavities, and channels. The dimensions of these channels and cavities are generally microporous. As used herein, "microporous" refers to pore diameters less than about 2 nanometers.

The methods of the invention are suitable for preparing SAPO-34, as well as other forms of SAPOs including, but not limited to, SAPO-5, SAPO-11, SAPO-16, SAPO-17, SAPO-20, SAPO-31, SAPO-35, SAPO-37, SAPO-40, SAPO-41, SAPO-42, and SAPO-44. Each of these classes of SAPO is individually separable and combinable to form its own group.

Crystalline SAPO-34 has the CHA structure and is an analog of the natural zeolite chabazite. The CHA framework structure contains single eight ring, double six ring, and single four ring secondary building units. SAPO-34 adsorption measurements have determined that $n$-$C_4H_{10}$ (0.43 nm diameter) can fit the pores, but $i$-$C_4H_{10}$ (0.5 nm) diameter cannot, thus the pore size is believed to be between 0.43 and 0.5 nm (Lok et al., in Lok. et al. (eds.) Crystalline Silicoalumino Phosphates, US, 1984).

Other SAPOs have different structures and different pore sizes. SAPOs and other molecular sieves can be classified as small, medium, or large-pore molecular sieves based on the size of the largest oxygen rings in the structure. Crystalline SAPO-5 has the AFI structure which contains rings of 12 oxygen atoms, 6 oxygen atoms, and 4 oxygen atoms. SAPO-5 is typically considered a large-pore molecular sieve. In contrast, crystalline SAPO-11 has the AEL structure which contains rings of 10 oxygen atoms, 6 oxygen atoms, and 4 oxygen atoms. SAPO-11 is typically considered a medium-pore molecular sieve. Structures where the largest ring contains 8 or fewer oxygen atoms are typically considered small-pore molecular sieves. Further information regarding SAPO structures is available in Baerlocher, W. M. Meier and D. H. Olson, "Atlas of Zeolite Framework Types", 5th ed., Elsevier: Amsterdam, 2001 and online at http://www.iza-strucures.org/databases.

In an embodiment, the silicoaluminophosphates formed by the methods of the invention have the framework composition $(Si_xAl_yP_z)O_2$ where
  x is between about 0.01 and about 0.98,
  y is between about 0.01 and about 0.60, and
  z is between about 0.01 and about 0.52.

In another embodiment, monovalent Li; divalent Be, Mg, Co, Fe, Mn, and Zn; trivalent B, Ga, and Fe; tetravalent Ge and Ti; pentavalent As, or combinations thereof may be substituted into the SAPO framework structure.

The membranes of the invention are formed through in-situ crystallization of an aqueous silicoaluminophosphate-forming gel. The gel contains an organic templating agent. The term "templating agent" or "template" is a term of art and refers to a species added to the synthesis media to aid in and/or guide the polymerization and/or organization of the building blocks that form the crystal framework. Gels for forming SAPO crystals are known to the art, but preferred gel compositions for forming membranes may differ from preferred compositions for forming loose crystals or granules. The preferred gel composition may vary depending upon the desired crystallization temperature and time.

In an embodiment, the gel is prepared by mixing sources of aluminum, phosphorus, silicon, and oxygen in the presence of a templating agent and water. The composition of the mixture may be expressed in terms of the following molar ratios as: 1.0 $Al_2O_3$:a$P_2O_5$:b$SiO_2$:cR:d$H_2O$, where R is a templating agent. In an embodiment, R is a quaternary ammonium templating agent. In an embodiment, the quaternary ammonium templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, or combinations thereof. In an embodiment, suitable for crystallization between about 420 K and about 500 K, a is between about 0.01 and about 52, b is between about 0.03 and about 196, c is between about 0.2 and about 5 and d is between about 20 and about 300. If other elements are to be substituted into the structural framework of the SAPO, the gel composition can also include $Li_2O$, BeO, MgO, CoO, FeO, MnO, ZnO, $B_2O_3$, $Ga_2O_3$, $Fe_2O_3$, GeO, TiO, $As_2O_5$ or combinations thereof.

In an embodiment suitable for crystallization of SAPO-34, c is less than about 2. In an embodiment suitable for crystallization of SAPO-34 at about 473 K for about 20 hours, a is about 1, b is about 0.6, c is about 1.07 and d is about 56. In an embodiment, R is a quaternary organic ammonium templating agent selected from the group consisting of tetrapropyl ammonium hydroxide, tetraethyl ammonium hydroxide (TEAOH), or combinations thereof.

In an embodiment suitable for crystallization of SAPO-5 at about 460 K for about 24 hours, a is about 1.0, b is about 0.4, c is about 2.0. and d is about 50. In an embodiment, R is a tripropylamine template (Gump, C. et al, Ind. Engr. Chem. Res, 2001, 40 (2), 565-577).

In an embodiment suitable for crystallization of SAPO-11 at about 460 K for about 24 hours, a is about 1.0, b is about 0.4, c is about 1.5, and d is about 50. In an embodiment, R is a dipropylamine template (Gump, C. et al, Ind. Engr. Chem. Res, 2001, 40 (2), 565-577).

In an embodiment, the gel is prepared by mixing sources of phosphate and alumina with water for several hours before adding the template. The mixture is then stirred before adding the source of silica. In an embodiment, the source of phosphate is phosphoric acid. Suitable phosphate sources also include organic phosphates such as triethyl phosphate, and crystalline or amorphous aluminophosphates. In an embodiment, the source of alumina is an aluminum alkoxide, such as aluminum isopropoxide. Suitable alumina sources also include pseudoboehmite and crystalline or amorphous aluminophosphates (gibbsite, sodium aluminate, aluminum trichloride). In an embodiment, the source of silica is a silica sol. Suitable silica sources also include fumed silica, reactive solid amorphous precipitated silica, silica gel, alkoxides of silicon (silicic acid or alkali metal silicate).

The gel is aged prior to use. As used herein, an "aged" gel is a gel that is held (not used) for a specific period of time after all the components of the gel are mixed together. In an embodiment, the gel is sealed and stirred during storage to prevent settling and the formation of a solid cake. Without wishing to be bound by any particular theory, it is believed that aging of the gel affects subsequent crystallization of the gel by generating nucleation sites. In general, it is believed that longer aging times lead to formation of more nucleation sites. The preferred aging time will depend upon the aging temperature selected. Preferably, crystal precipitation is not observed during the aging period. Preferably, the viscosity of the aged gel is such that the gel is capable of penetrating the pores of the porous support. After initial mixing of the components of the synthesis gel in a container, material can settle to the bottom of the container. In an embodiment, the gel is stirred and aged until no settled material is visible at the bottom of the container and the gel appears translucent and substantially uniform to the eye. In different embodiments, the aging time at room temperature is at least about twenty-four hours, greater than about twenty-four hours, at least about forty-eight hours, and at least about seventy-two hours. For SAPO-34 membranes, in different embodiments the aging time at room temperature can be at least about forty-eight hours, at least about seventy-two hours, and between about three days and about seven days. The same batch of gel may be used for all the crystallization steps, so long as the upper limit of the aging time is not exceeded. Alternately, more than one batch of gel may be prepared and aged, with different batches being used for one or more crystallization step(s). In an embodiment, each crystallization step may use a different batch of gel. The aging time of different batches of gel at the time of use may be the same or may be different.

The aged gel is brought into contact with at least one surface of the porous support. In an embodiment, the porous support may be immersed in the gel so that more than one surface of the porous support contacts the gel. In an embodiment, at least some of the gel penetrates the pores of the support. The pores of the support need not be completely filled with gel. In an embodiment, the porous support is brought into contact with a sufficient quantity of gel such that growth of the SAPO membrane is not substantially limited by the amount of gel available.

The porous support is a body capable of supporting the SAPO membrane. The porous support may be of any suitable shape, including disks and tubes. In an embodiment, the porous support is in the form of a tube. In an embodiment, the porous support is a metal or an inorganic material. In an embodiment, the porous support does not appreciably dissolve or form reaction products at the interface when placed in contact with the synthesis gel. Suitable inorganic porous supports include, but are not limited to, α-alumina, glass, titania, zirconia, carbon, silicon carbide, clays or silicate minerals, aerogels, supported aerogels, and supported silica, titania and zirconia. Suitable porous metal supports include, but are not limited to, stainless steel, nickel based alloys (Inconel, Hastalloy), Fecralloy, chromium and titanium. The metal may be in the form of a fibrous mesh (woven or non-woven), a combination of fibrous metal with sintered metal particles, and sintered metal particles. In an embodiment, the metal support is formed of sintered metal particles.

The pore diameter of the support is preferably large enough to allow the synthesis gel to penetrate the support. Furthermore, the pore diameter of the support is preferably large enough so that SAPO crystals can form inside the support. Often, a porous support will have a distribution of pore sizes. Preferably, the pore diameter of the support is greater than about 0.2 microns. The pore diameter of the support being greater than about 0.2 microns does not require that every single pore in the support is greater than about 0.2 microns, but it does exclude supports having regions where the characteristic pore size is about 0.2 microns (for example, a support having a layer with an 0.2 micron average pore size). The characteristic pore size may be taken as the average, median or largest pore size. In different embodiments, the pore size of the support is greater than about 1 micron, between about 2 and about 6 microns, or about 4 microns. The porous support may be joined to nonporous material which provides a sealing surface for use of the membrane. This nonporous material may also be immersed in or partially covered with synthesis gel during the synthesis process, in which case SAPO crystals may form on the nonporous material as well.

In an embodiment, the porous support is cleaned prior to being brought into contact with the synthesis gel. The support may be cleaned by being boiled in purified water. After cleaning with water, the support may then be dried.

After the porous support and the aged gel are brought into contact, the support and gel are heated in a SAPO crystal synthesis step. This synthesis step can lead to formation of SAPO crystals on and in the porous support. During each synthesis step a layer of SAPO crystals can be said to form on the surface of the porous support and/or on previously formed SAPO crystals. The layer of SAPO crystals formed during each synthesis step may not be continuous. During the synthesis step, crystals may also precipitate from the synthesis gel without being incorporated into the SAPO membrane. In an embodiment, the synthesis temperature is between about 420K and about 500K. In different embodiments, the synthesis temperature is between about 450K and about 480K, or between about 465K and about 480K. In an embodiment, the crystallization time is between about 15 and about 25 hours. In a different embodiment, the crystallization time is about 20 hours. Synthesis typically occurs under autogenous pressure.

In an embodiment, excess synthesis gel is removed from the support and the SAPO crystals after each synthesis step. The excess gel may be removed by washing with water. After washing with water, the support and SAPO crystals may then be dried.

In an embodiment, the synthesis step may be repeated in order to form a greater amount of SAPO crystals. After each synthesis step, the excess synthesis gel is removed and then the porous support is brought into contact with aged synthesis gel before performing the next synthesis step. In an embodiment, sufficient synthesis steps are performed so that the cumulative layer formed on the support surface by the synthesis steps forms a continuous layer. The SAPO membrane is formed by the cumulative layer(s) of SAPO crystals formed on the support surface(s) and the (interconnected) SAPO crystals formed inside the porous support. In an embodiment, the SAPO crystals inside the support are substantially interconnected. In an embodiment, the interconnected SAPO crystals are connected to the layers of SAPO crystals formed on the support surface. In an embodiment, sufficient synthesis steps are performed that the membrane is impermeable to nitrogen after preparation (but before calcination).

After SAPO crystal synthesis is complete, the SAPO membranes are calcined to substantially remove the organic template material. After calcinations, the membrane becomes a semi-permeable barrier between two phases that is capable of restricting the movement of molecules across it in a very specific manner. In different embodiments, the calcination temperature is between about 600 K and about 900K, and between about 623K and about 773K. For membranes made using TEOH and TPAOH as a templating agent, the calcining temperature can be between about 623 K and about 673 K. In an embodiment, the calcination time is between about 15 hours and about 25 hours. Longer times may be required at lower temperatures in order to substantially remove the template material. Use of lower calcining temperatures can reduce the formation of calcining-related defects in the membrane. The heating rate during calcination should be slow enough to limit formation of defects such as cracks. In an embodiment, the heating rate is less than about 2.0 K/min. In a different embodiment, the heating rate is about 0.6 K/min. Similarly, the cooling rate must be sufficiently slow to limit membrane defect formation. In an embodiment, the cooling rate is less than about 2.0 K/min. In a different embodiment, the cooling rate is about 0.9 K/min.

In an embodiment, the SAPO membranes of the present invention comprise SAPO crystals which are present within at least some of the pores of the support and which form a layer on at least one side of the porous support. The thickness of the SAPO layer depends in part on the number of synthesis steps performed. In embodiment where synthesis steps are performed until the membrane is impermeable to nitrogen, the thickness of the cumulative SAPO layer is less than about 20 microns. When the layer thicknesses are measured from cross-sections with scanning electron microscopy, the uncertainty in the thickness measurement is believed to be on the order of ±10%. In another embodiment, the thickness of the SAPO layer is about 5 microns. In an embodiment, immersion of a porous support in the synthesis gel can lead to formation of SAPO crystals within the support as well as on both sides of the support. For example, immersion of a porous tube in the synthesis gel can lead to formation of SAPO crystals within the tube as well as formation of a SAPO layer on the inside and the outside of the tube. In an embodiment, the SAPO crystals may form throughout the thickness of the support. When both sides of the support are immersed and capable of being penetrated by the gel, formation of SAPO crystals throughout the thickness of the support indicates that the synthesis gel has penetrated to the center of the support. However, formation of SAPO crystals throughout the support does not require that SAPO crystals completely fill the pore space of the support.

Transport of gases through a zeolite-type membrane can be described by several parameters. As used herein, the flux, $J_i$, through a membrane is the number of moles of a specified component i passing per unit time through a unit of membrane surface area normal to the thickness direction. The permeance or pressure normalized flux, $P_i$, is the flux of component i per unit transmembrane driving force. For a diffusion process, the transmembrane driving force is the gradient in chemical potential for the component (Kärger, J. Ruthven, D. M., Diffusion in Zeolites, John Wiley and Sons: New York, 1992, pp. 9-10). The selectivity of a membrane for components i over j, $S_{i/j}$ is the permeance of component i divided by the permeance of component j. The ideal selectivity is the ratio of the permeances obtained from single gas permeation experiments. The actual selectivity (also called separation selectivity) for a gas mixture may differ from the ideal selectivity.

Transport of gases through zeolite pores can be influenced by several factors. As used herein, "zeolite pores" are pores formed by the crystal framework of a zeolite-type material. A model proposed by Keizer et al. (J. Memb. Sci., 1998, 147, p. 159) has previously been applied to SAPO-34 membranes (Poshusta et al., AlChE Journal, 2000, 46 (4), pp 779-789). This model states that both molecular sizes relative to the zeolite pore and the relative adsorption strengths determine the faster permeating species in a binary mixture. This gives rise to three separation regimes where both components are able to diffuse through the molecular sieve pores. In the first region, both molecules have similar adsorption strengths, but one is larger and its diffusion is restricted due to pore walls. In the first region, the membrane is selective for the smaller molecule. In region 2, both molecules have similar kinetic diameters, but one adsorbs more strongly. In region 2, the membrane is selective for the strongly adsorbing molecule. In region 3, the molecules have significantly different diameters and adsorption strengths. The effects of each mechanism may combine to enhance separation or compete to reduce the selectivity.

In an embodiment, the SAPO-34 membranes of the invention have room-temperature $CO_2/CH_4$ separation selectivities greater than about 60 for an approximately 50/50 $CO_2/CH_4$ mixture with about 222 kPa feed pressure and about 138 kPa pressure drop. In an embodiment, the $CO_2/CH_4$ separation selectivity of the SAPO-34 membranes of the invention is greater than about 270 at a temperature of about 250 K for an approximately 50/50 $CO_2/CH_4$ mixture with about 222 kPa feed pressure and about 138 kPa pressure drop.

In industrial gas separation processes, the pressure drop across the membrane can be several MPa. For example, in the natural gas separation industry, the trans-membrane pressure drop is about 6 MPa. Therefore, the membrane separation selectivity for trans-membrane pressure differentials in the MPa range can be very important. In an embodiment, the $CO_2/CH_4$ separation selectivity of the SAPO-34 membranes of the invention is greater than about 200 at a temperature of about 253 K for an approximately 50/50 $CO_2/CH_4$ mixture with about 3 MPa pressure drop. In an embodiment, the $CO_2/CH_4$ separation selectivities of the SAPO-34 membranes of the invention are greater than about 120 at a temperature of about 253 K with about 3 MPa pressure drop for $CO_2/CH_4$ mixtures with $CO_2$ concentration varying from approximately 14 to approximately 70%.

In natural gas separation, the methane loss in the permeate should be reduced as low as possible. That is, high $CO_2$ permeate concentration is an important parameter. In an embodiment, the $CO_2$/permeate concentration is greater than about 99.4% for the SAPO-34 membranes of the invention at a temperature of about 253 K for an approximately 50/50 $CO_2/CH_4$ mixture with about 3 MPa pressure drop. In an embodiment, the $CO_2$ permeate concentrations for the SAPO-34 membranes of the invention are greater than about 93.5% for a 14/86 $CO_2/CH_4$ mixture, and greater than 99.7% for 70/30 $CO_2/CH_4$ mixture at a temperature of about 253 K with about 3 MPa pressure drop.

Transport of gases through a crystalline zeolite-type material such as a SAPO membrane can also be influenced by any "nonzeolite pores" in the membrane structure. "Nonzeolite pores" are pores not formed by the crystal framework. Intercrystalline pores are an example of nonzeolite pores. The contribution of nonzeolite pores to the flux of gas through a zeolite-type membrane depends on the number, size and selectivity of these pores. If the nonzeolite pores are sufficiently large, transport through the membrane can occur through Knudsen diffusion or viscous flow. For some SAPO-34 membranes, membranes with more nonzeolite pores have been shown to have lower $CO_2/CH_4$ selectivities (Poshusta et al., AlChE Journal, 2000, 46 (4), pp 779-789). As the pressure drop increases, any transport through viscous flow contributes more to the overall flux and thus can decrease the selectivity of the membrane. Therefore, membranes with fewer nonzeolite pores can have better separation selectivities at higher pressures.

The membranes of the invention can be selectively permeable to some gases over others. For example, the SAPO-34 membranes of the invention are selectively permeable to $CO_2$ over $CH_4$, especially at lower temperatures. Therefore, the invention provides a method for separating two gases in a feedstream including these two gas components using the membranes of the invention. The feedstream is applied to the feed side of the membrane, generating a retentate stream and a permeate stream. In order to separate the two gases, sufficient transmembrane driving force must be applied that at least one of the gases permeates the membrane. In an embodiment, both gases permeate the membrane. If the membrane is selectively permeable to a first gas component over a second gas component, the permeate stream will be enriched in the first gas component while the retentate stream will be depleted in the first component. The permeate stream being enriched in the first gas component implies that the concentration of the first gas component in the permeate stream is greater than its concentration in the feedstream. Similarly, the retentate stream being depleted in the first gas component implies that the concentration of the first gas component in the retentate stream is less than its concentration in the feedstream.

EXAMPLES

Example 1

Preparation of SAPO-34 Membranes

SAPO-34 membranes were prepared on porous stainless steel tubes. These tubes had approximately 4-μm pores, a length of approximately 30 mm, an inner diameter of approximately 7.2 mm and an outer diameter of approximately 9.5 mm. (81180-017-PRDC-TEST, Pall Corporation). Non-porous, stainless steel tubes were welded onto each end of the stainless steel support to prevent membrane bypass and to provide a sealing surface for o-rings. The combined length of the combined porous and dense tube assembly was approximately 59 mm. The permeate area was approximately 7.8 cm². Before synthesis, the tube assembly was boiled in purified water for 3 h and dried at 373 K under vacuum for 30 min.

The synthesis gel had the approximate molar composition: $Al_2O_3:P_2O_5:0.6\ SiO_2:1.07\ TEAOH:56\ H_2O$, and was prepared by stirring $H_3PO_4$ (85 wt % aqueous solution), $Al(i-C_3H_7O)_3$ (>99.99%, Aldrich), and $H_2O$ at room temperature for 12 h. Then the template, tetra-ethyl ammonium hydroxide (TEAOH, 35 wt % aqueous solution, Aldrich), was added, and the mixture was stirred for 30 min before the colloidal silica sol (Ludox AS40, 40% aqueous solution) was added. The solution was sealed and stirred during storage to prevent settling and the formation of a solid cake. The gel was aged for approximately 3 days at room temperature before use.

The stainless tube assembly was directly placed vertically in a Teflon tube in an autoclave. The Teflon tube was then filled with synthesis gel to cover the end of the stainless tube assembly. Typically, the gel level was approximately 10 mm above the upper end of the stainless tube assembly. An approximately 24.5 mm diameter and approximately 104 mm high Teflon tube holds approximately 35 ml of synthesis gel and three stainless tube assemblies. An approximately 41 mm diameter and approximately 100 mm high Teflon tube holds approximately 50 ml of synthesis gel and eight stainless tube assemblies. The hydrothermal synthesis was carried at about 473 K for about 20 h. After synthesis, the membrane was washed with purified water at 297 K and dried at about 373 K in an oven for about 10 mins. A second synthesis layer was applied using the same procedure, but the tube was inverted to obtain a more uniform layer. The third and fourth synthesis layer (if used) were prepared using the same procedure as the first and second layers, except that a new batch of aged synthesis gel was used. Good quality membranes were prepared with 3-4 synthesis.

Membranes were impermeable to $N_2$ after preparation but before calcination. To remove the TEAOH template from the zeolite framework, membranes were calcined at about 663 K for about 20 h. The heating and cooling rates were about 0.6 and about 0.9 K/min, respectively.

Example 2

Transport Properties of SAPO-34 Membranes

Single-gas and mixture permeation was measured on a system similar to that used by Poshusta et al. (Ind. Eng. Chem. Res., 1998, 37. p. 3924), but modified for the study of light gases at pressure drop as high as 3 MPa. The membranes were mounted in a stainless-steel module, and sealed at each end with silicone O-rings. Fluxes were measured using a soap-film bubble flowmeter and a stopwatch. The lowest measurable permeace was estimated to be $9.6 \times 10^{-11}$ mol/($m^2$ s Pa).

Carbon dioxide and $CH_4$ single gas and mixture permeation was investigated as a function of temperature and pressure drop for some membranes. For mixture separation, mass flow controllers were used to mix pure $CO_2$ and $CH_4$ gases. The total flow rate was 1300 mL/min for most of the experiments. The pressure on each side of the membrane was independently controlled between 84 kPa and 3.4 MPa. To carry out gas separation below room temperature, the membrane module and some system lines were placed into an ethyl glycol/water (50/50) bath. The lowest temperature investigated was about 250 K. The compositions of the feed, retentate, and permeate streams were measured using a Hewlett-Packard 5890/series 11 gas chromatograph equipped with a thermal conductivity detector and HAYESEP-D column (Alltech). The oven, injector, and detector temperatures were all kept at 423 K.

$CO_2/CH_4$ Room Temperature Results

Table 1 shows permeation properties at 297 K for a 50/50 $CO_2/CH_4$ mixture (222 kPa feed pressure and 138 kPa pressure drop) for five membranes (M1-M5) prepared using the methods of the invention. These five membranes were prepared in one batch and each had four synthesis layers. Each of the five membranes had a $CO_2/CH_4$ separation selectivity in excess of 60.

TABLE 1

| Membrane | Permeance (mol/$m^2$ · s · Pa) | | $CO_2$ permeate concentration (mol %) | $CO_2/CH_4$ Separation selectivity |
|---|---|---|---|---|
| | $CO_2 \times 10^7$ | $CH_4 \times 10^9$ | | |
| M1 | 1.1 | 1.2 | 96.2 | 93 |
| M2 | 0.97 | 1.3 | 95.4 | 73 |
| M3 | 0.87 | 1.6 | 94.8 | 63 |
| M4 | 1.0 | 1.3 | 95.0 | 67 |
| M5 | 1.0 | 1.5 | 95.1 | 67 |

The single-gas permeance for $CO_2$ decreased with increasing pressure drop, whereas the single-gas permeance for $CH_4$ was almost constant at 297 K through membrane M1 at a permeate pressure of 125 kPa (FIG. 1). Thus, the $CO_2$/CH4 ideal selectivity decreased with increasing pressure drop (FIG. 1).

Figure 2:
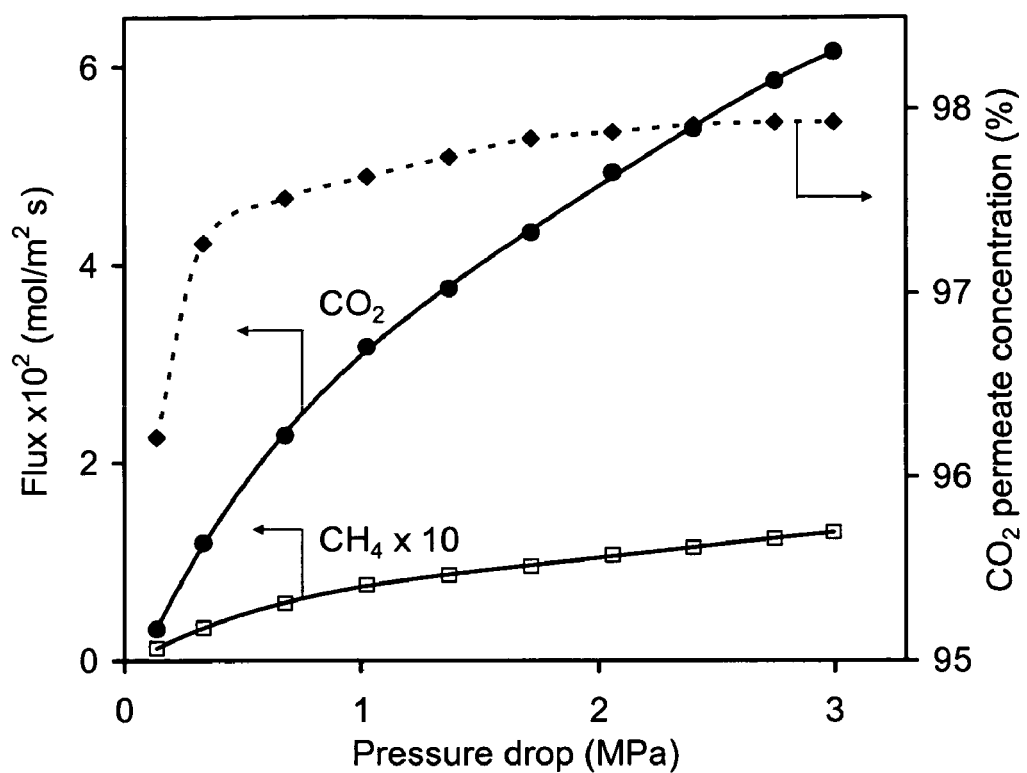
FIG. 2 shows $CO_2$ and $CH_4$ fluxes and $CO_2$ permeate concentration of a $CO_2/CH_4$ mixture (50/50) as a function of pressure drop for a SAPO-34 membrane at 297 K. The permeate pressure was 92 kPa.
Figure 3:
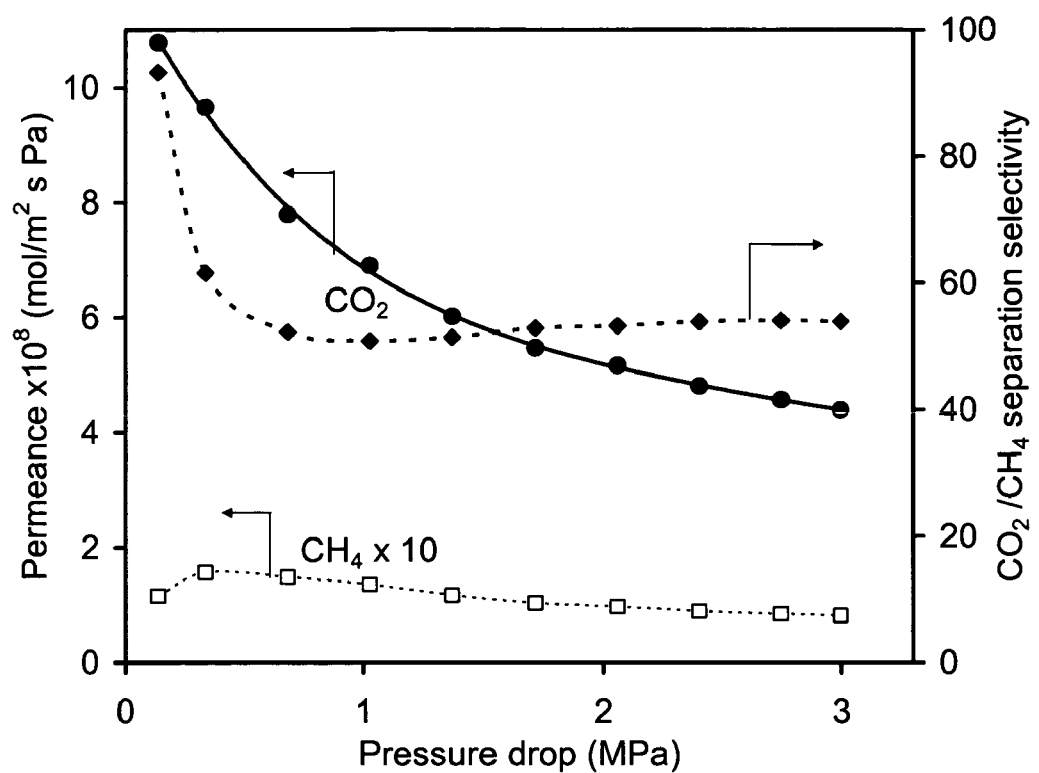
FIG. 3 shows $CO_2$ and $CH_4$ permeances and $CO_2/CH_4$ separation selectivity for a $CO_2/CH_4$ mixture (50/50) as a function of pressure drop for a SAPO-34 membrane at 297 K. The permeate pressure was 92 kPa.

Both $CO_2$ and $CH_4$ fluxes in an equimolar $CO_2/CH_4$ mixture increased with pressure drop for membrane M1 (FIG. 2). The $CO_2$ permeate concentration also increased with increasing pressure drop, and it was 98% at a pressure drop of 3 MPa. The $CO_2/CH_4$ separation selectivity continuously decreased as pressure drop increased from 0.14 to 1.0 MPa because the $CO_2$ permeance decreased more than $CH_4$ permeance (FIG. 3). The separation selectivity was almost constant as pressure drop further increased.

$CO_2/CH_4$ Results Below Room Temperature

Figure 4:
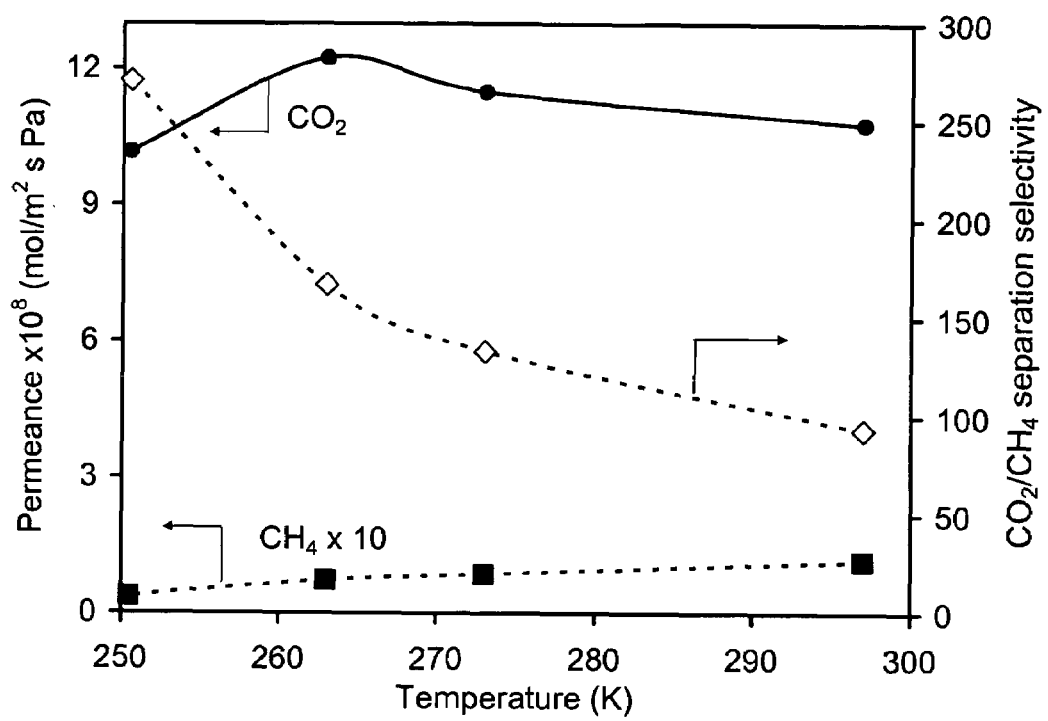
FIG. 4 shows $CO_2$ and $CH_4$ permeances and $CO_2/CH_4$ separation selectivity for a $CO_2/CH_4$ mixture (50/50) as a function of temperature for a SAPO-34 membrane with a pressure drop of 138 kPa. The permeate pressure was 84 kPa.
Figure 5:
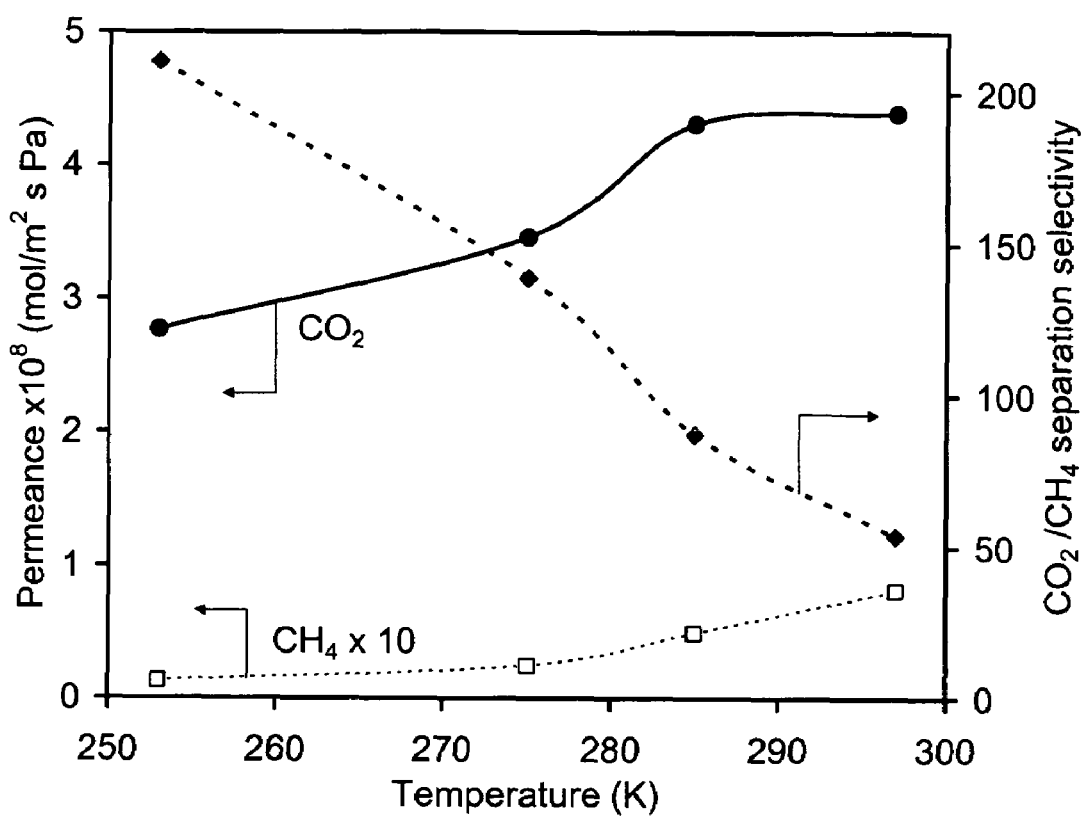
FIG. 5 shows $CO_2$ and $CH_4$ permeances and $CO_2/CH_4$ separation selectivity for a $CO_2/CH_4$ mixture (50/50) as a function of temperature for a SAPO-34 membrane with a pressure drop of 3 MPa. The permeate pressure was 92 kPa.
Figure 6:
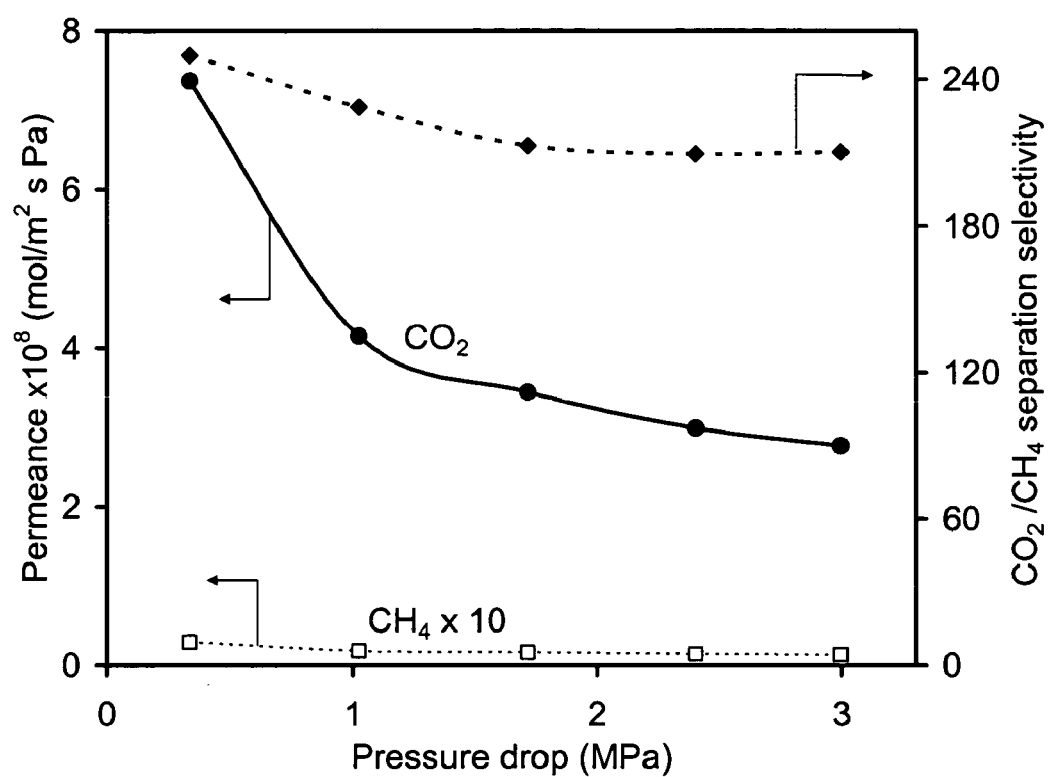
FIG. 6 shows $CO_2$ and $CH_4$ permeances and $CO_2/CH_4$ separation selectivity for a $CO_2/CH_4$ mixture (50/50) as a function of pressure drop for a SAPO-34 membrane at 253 K. The permeate pressure was 92 kPa.

FIG. 4 shows the $CO_2$ and $CH_4$ permeances and the $CO_2/CH_4$ separation selectivity as a function of temperature for membrane M1 for a feed pressure of 222 kPa, a pressure drop of 138 kPa, and a 50/50 $CO_2/CH_4$ mixture. FIG. 4 shows that this membrane separated $CO_2$ from $CH_4$ with a selectivity as high as 270 and a $CO_2$ permeance of $1.0 \times 10^{-7}$ mol/($m^2$ s Pa) at 250.5 K. FIG. 5 shows the $CO_2$ and $CH_4$ permeances and the $CO_2/CH_4$ separation selectivity as a function of temperature for membrane M1 at a permeate pressure of 92 kPa, a pressure drop of 3 MPa, and a 50/50 $CO_2/CH_4$ mixture. FIG. 5 shows that this membrane separated $CO_2$ from $CH_4$ with a selectivity as high as 210 at 253 K and a pressure drop of 3 MPa. FIG. 6 shows the effect of pressure on the $CO_2$ and $CH_4$ permeances and the $CO_2/CH_4$ separation selectivity at 253 K. The $CO_2/CH_4$ separation selectivities were higher than 210.

Figure 7:
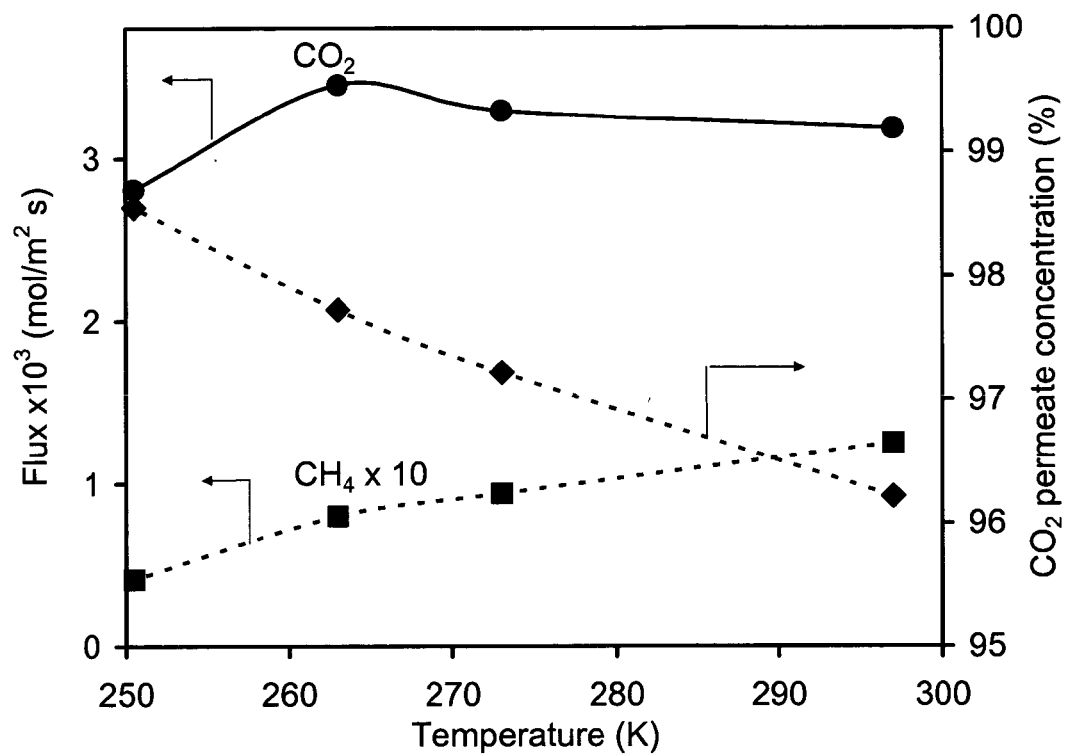
FIG. 7 shows $CO_2$ and $CH_4$ fluxes and $CO_2$ permeate concentration of a $CO_2/CH_4$ mixture (50/50) as a function of temperature for a SAPO-34 membrane with a pressure drop of 138 kPa. The permeate pressure was 84 kPa.
Figure 8:
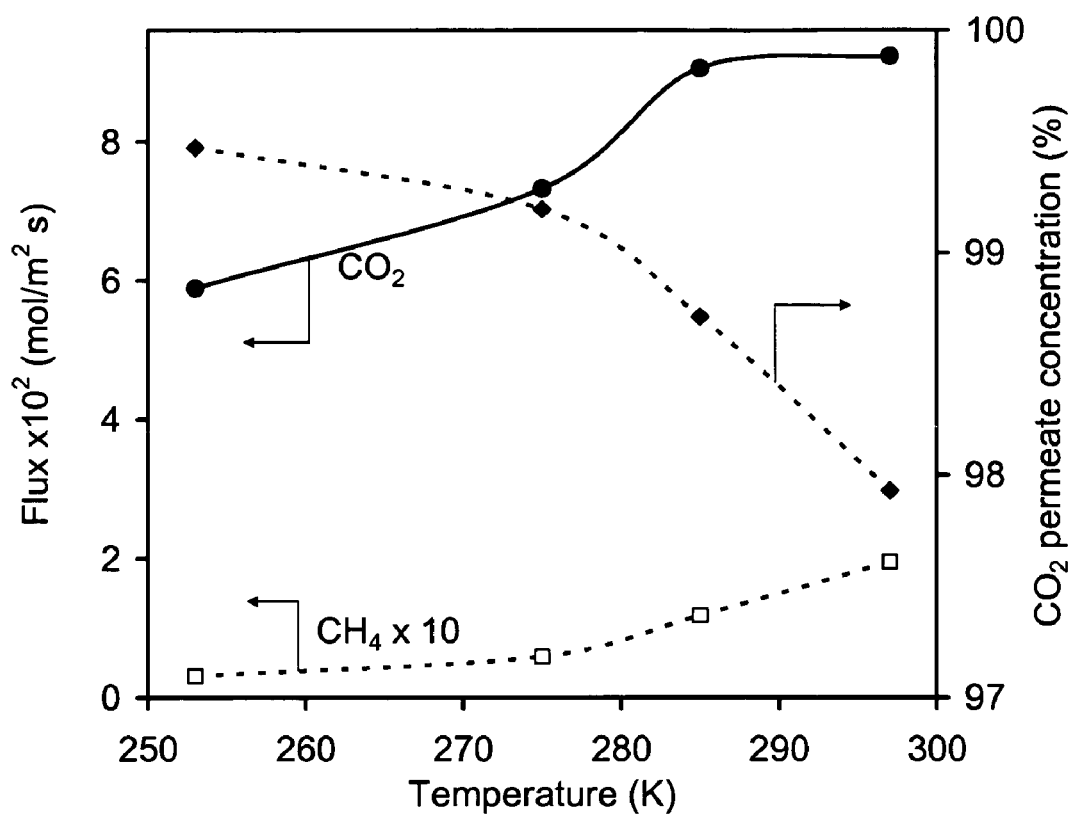
FIG. 8 shows $CO_2$ and $CH_4$ fluxes and $CO_2$ permeate concentration of a $CO_2/CH_4$ mixture (50/50) as a function of temperature for a SAPO-34 membrane with a pressure drop of 3 MPa. The permeate pressure was 92 kPa.
Figure 9:
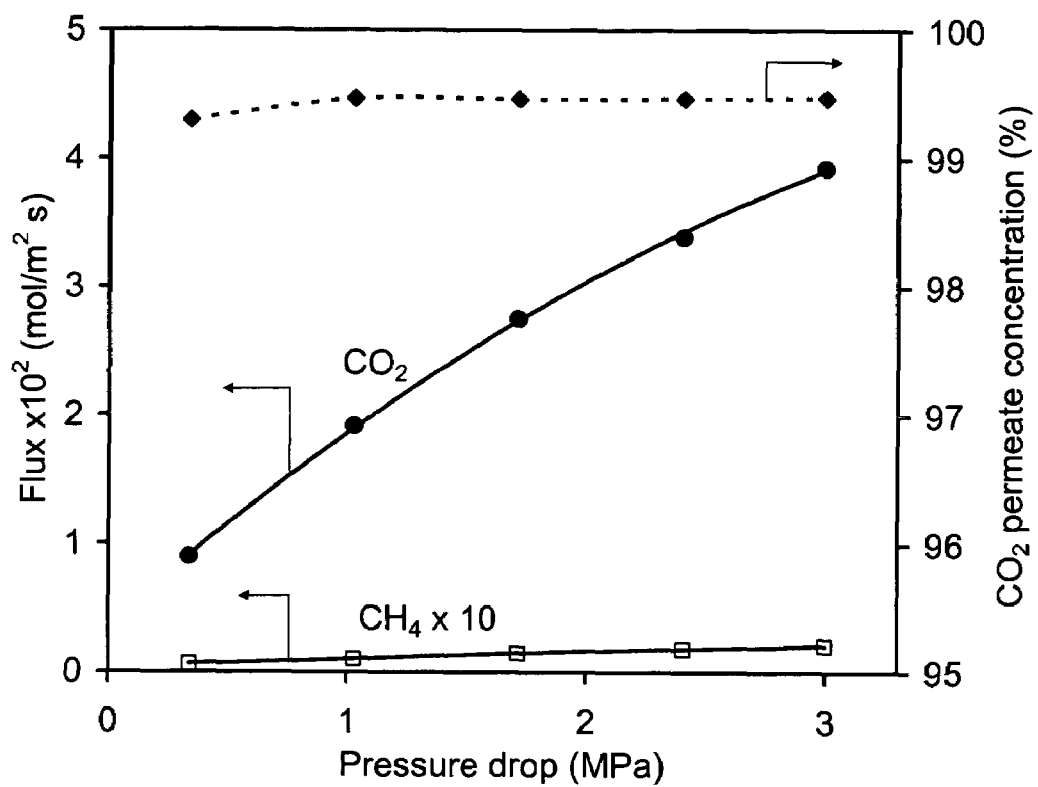
FIG. 9 shows $CO_2$ and $CH_4$ fluxes and $CO_2$ permeate concentration of a $CO_2/CH_4$ mixture (50/50) as a function of pressure drop for a SAPO-34 membrane at 253 K. The permeate pressure was 92 kPa.

FIG. 7 shows the $CO_2$ and $CH_4$ fluxes and $CO_2$ permeate concentration of a $CO_2/CH_4$ mixture (50/50) as a function of temperature for membrane M1 at permeate pressure of 84 kPa and a pressure drop of 138 kPa. The $CO_2$ permeate concentration was 98.6% at 250.5 K. FIG. 8 shows the $CO_2$ and $CH_4$ fluxes and $CO_2$ permeate concentration of a $CO_2/CH_4$ mixture (50/50) as a function of temperature for membrane M1 at permeate pressure of 92 kPa and a pressure drop of 3 MPa. FIG. 8 shows the $CO_2$ permeate concentration was 99.5% at 253 K. FIG. 9 shows the $CO_2$ and $CH_4$ fluxes and $CO_2$ permeate concentration of a $CO_2/CH_4$ mixture (50/50) as a function of pressure drop at 253 K. The $CO_2$ permeate concentrations were higher than 99.3%.

Figure 10:
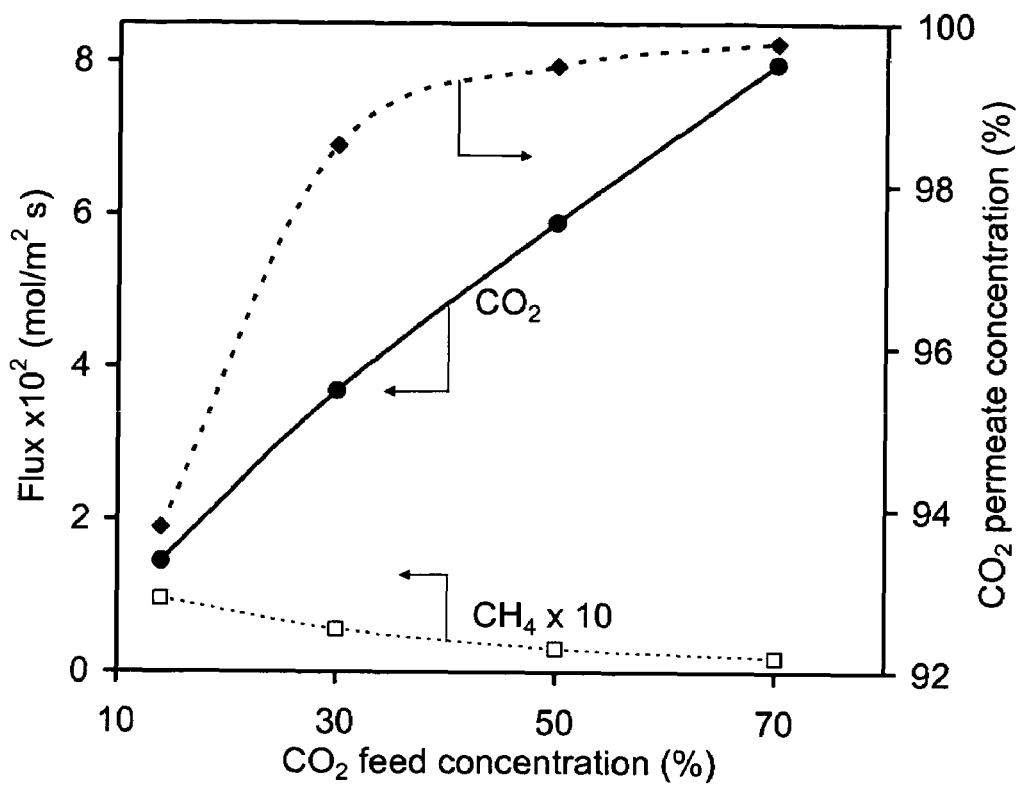
FIG. 10 shows $CO_2$ and $CH_4$ fluxes and $CO_2$ permeate concentration at 253 K as a function of $CO_2$ feed concentration for a SAPO-34 membrane with a pressure drop of 3 MPa. The permeate pressure was 92 kPa.
Figure 11:
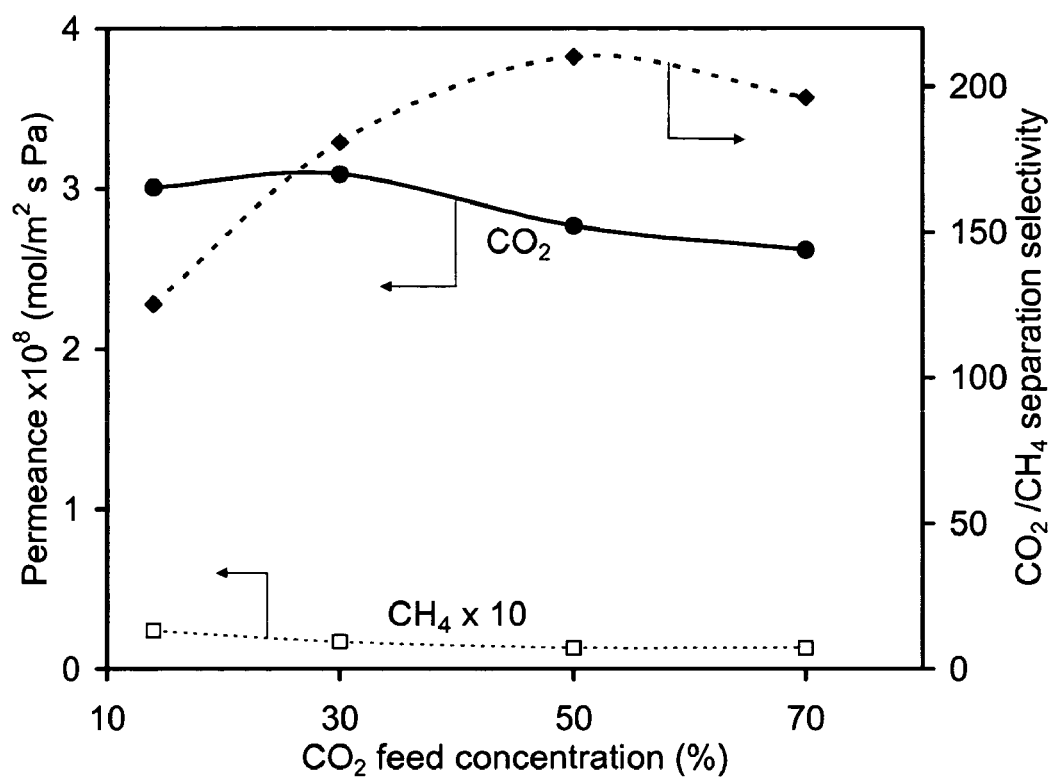
FIG. 11 shows $CO_2$ and $CH_4$ permeances and $CO_2/CH_4$ separation selectivity at 253 K as a function of $CO_2$ feed concentration for a SAPO-34 membrane with a pressure drop of 3 MPa. The permeate pressure was 92 kPa.

FIG. 10 shows the $CO_2$ and $CH_4$ fluxes and $CO_2$ permeate concentration at 253 K as a function of $CO_2$ feed concentration for membrane M1 at a permeate pressure of 92 kPa and a pressure drop of 3 MPa Even for a 14% feed, the $CO_2$ permeate concentration was as high as 93.8%. FIG. 11 shows the permeances of $CO_2$ and $CH_4$ and $CO_2/CH_4$ selectivity at 253 K as a function of $CO_2$ feed concentration for membrane M1 at a permeate pressure of 92 kPa and a pressure drop of 3 MPa. The $CO_2/CH_4$ selectivity exhibited a maximum at a $CO_2$ feed concentration of 50%.

Results for Other Gases

Table 2 illustrates ideal and mixture separation selectivities for various gas mixtures through membrane M2. (84 kPa permeate pressure and 138 kPa pressure drop).

TABLE 2

| Gas mixtures | Temperature (K) | Ideal Selectivity* | Separation selectivity** |
|---|---|---|---|
| $H_2/CH_4$ | 297 | 41 | 35 |
| $H_2/N_2$ | 473 | 7.9 | 8.1 |
| $H_2/CO_2$ | 473 | 2.3 | 1.7 |
| $H_2/CO$ | 473 | 6.7 | NM |
| $H_2/n-C_4H_{10}$ | 473 | >330 | NM*** |
| $CO_2/N_2$ | 297 | 20 | NM |
| $N_2/CH_4$ | 297 | 6.5 | NM |

*Ideal selectivity: the ratio of single gas permeances
**Separation selectivity: the ratio of the permeances for mixtures (50/50)
***NM: not measured Example 3

Scanning Electron Microscope Analysis of an SAPO-34 Membrane

Scanning Electron Microscope (SEM) images of membrane M5 are shown in FIGS. 12-16.

Figure 12:
FIG. 12 is a top view of the surface of a SAPO-34 membrane on the inside of the support.
Figure 13:
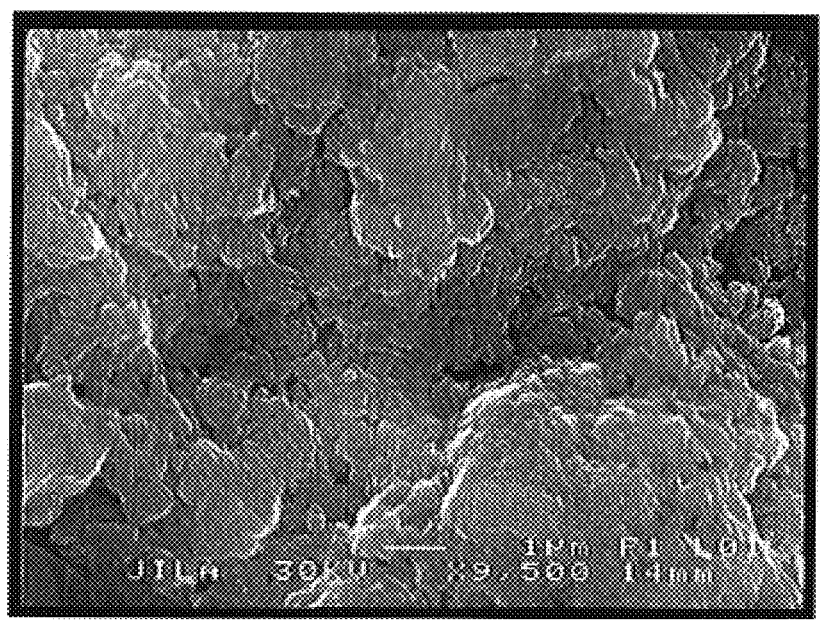
FIG. 13 is a top view of the surface of a SAPO-34 membrane on the outside of the support.

FIGS. 12 and 13 show top views of the inner (FIG. 12) and outer (FIG. 13) membrane surfaces. FIGS. 12 and 13 show intergrown zeolite crystals with size less than approximately 1 µm.

Figure 14:
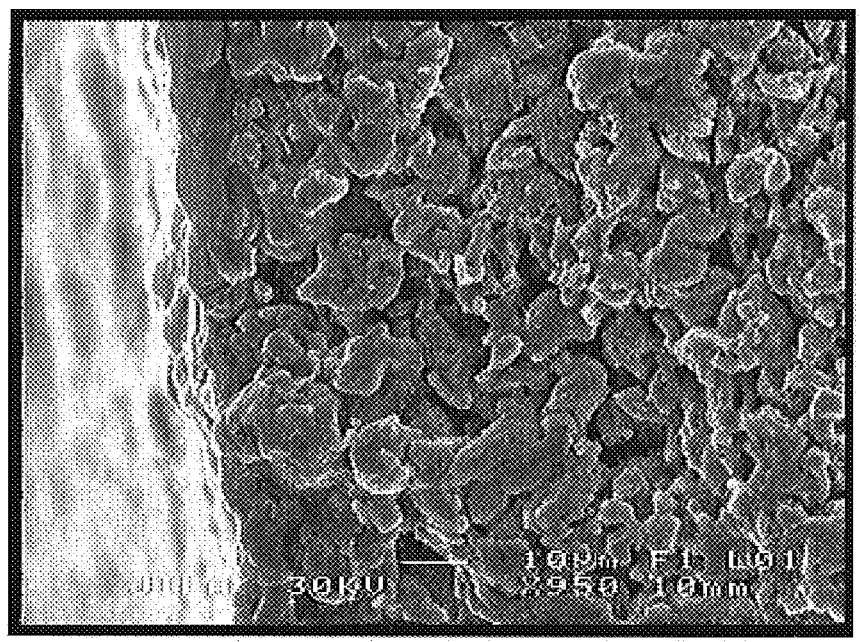
FIG. 14 is a cross-sectional view of a SAPO-34 membrane on the inside of the support.
Figure 15:
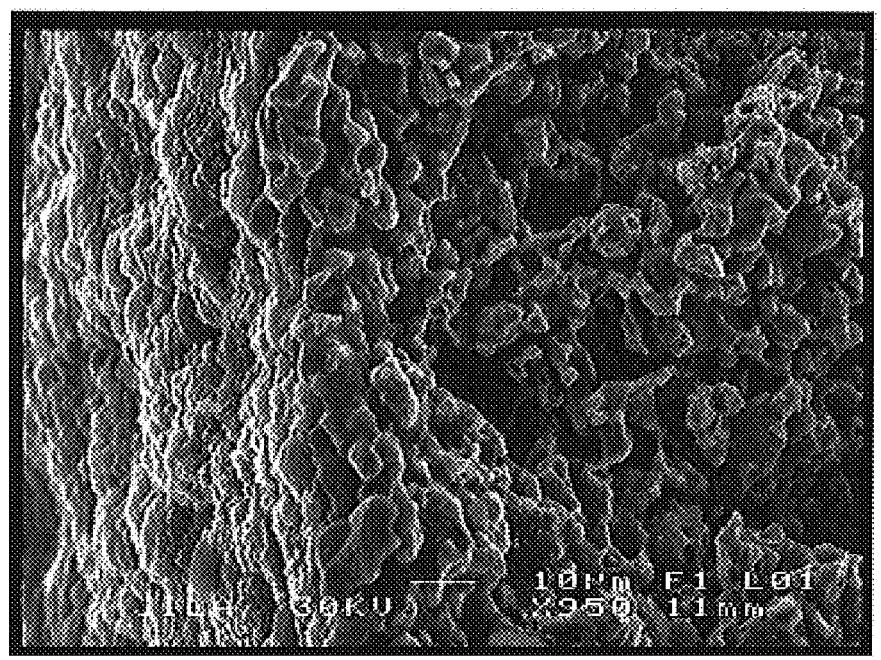
FIG. 15 is a cross-sectional view of a SAPO-34 membrane on the outside of the support.

FIGS. 14 and 15 are cross-sectional views of the membrane on the inside (FIG. 14) and outside (FIG. 15) of the stainless steel support. In both figures, the SAPO layer is towards the left side of the micrograph. FIGS. 14 and 15 show a continuous zeolite layer on both the inside and the outside of the support. Each zeolite layer was approximately 5 µm thick on top of the stainless-steel support.

Figure 16:
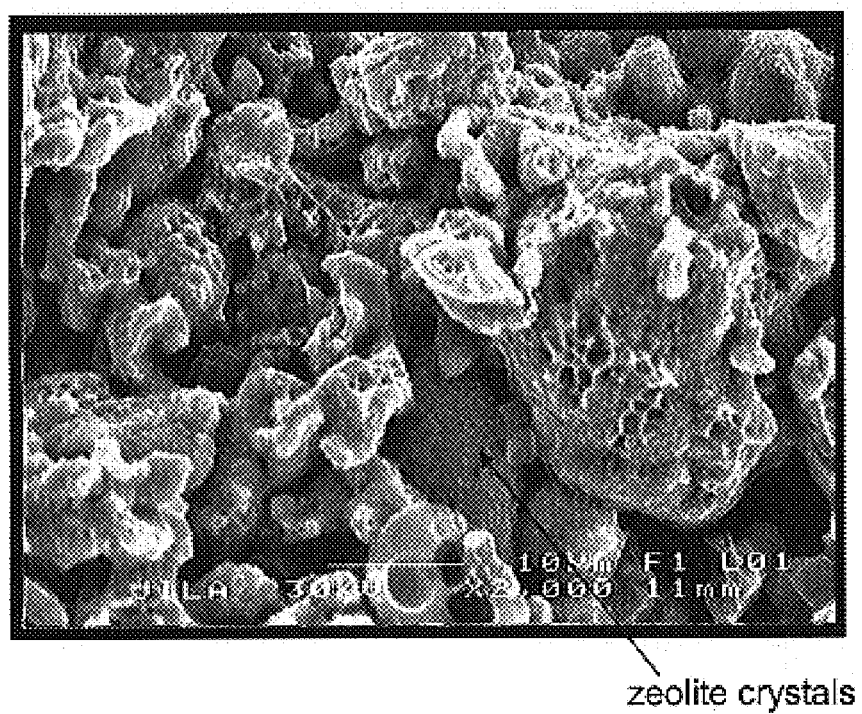
FIG. 16 is a cross-sectional SEM micrograph of the middle of a support after a SAPO-34 membrane synthesis.

FIG. 16 is a cross-sectional SEM micrograph of the middle of the porous stainless steel support after membrane synthesis. FIG. 16 shows that zeolite crystals appear to be dispersed into the middle of the support (see arrow). This is as expected because the synthesis procedure for this membrane allowed the gel to soak into the support before crystallization.

All references cited herein are incorporated by reference to the extent not inconsistent with the disclosure herein.

Those of ordinary skill in the art will appreciate that the SAPO membranes of the invention may be made using starting materials other than those specifically disclosed herein and that procedures and techniques functionally equivalent to those described herein can be employed to make, assess, and use the SAPO membranes described herein.

The invention claimed is:

1. A method for making a crystalline silicoaluminophosphate (SAPO) membrane, the method comprising the steps of:
   a) providing a porous support;
   b) preparing an aqueous SAPO forming gel comprising an organic templating agent;
   c) aging the gel;
   d) contacting the porous support with the aged gel;
   e) heating the porous support and the gel to form a layer of SAPO crystals on the surface of the support; and
   f) calcining the SAPO layer to remove the templating agent
wherein the gel is aged at least 24 hours between about 290 K and about 300 K.

2. The method of claim 1, wherein the SAPO is selected from the group consisting of SAPO-5, SAPO-11, SAPO-16, SAPO-17, SAPO-20, SAPO-31, SAPO-34, SAPO-35, SAPO-37, SAPO-40, SAPO-41, SAPO-42, and SAPO-44.

3. The method of claim 2, wherein the SAPO is SAPO-5, SAPO-11, or SAPO-34.

4. The method of claim 3, wherein the SAPO is SAPO-34.

5. The method of claim 1, wherein the porous support has a pore size large enough so that SAPO crystals can also form inside the pores of the support.

6. The method of claim 1, wherein the porous support has a pore size between about 0.2 microns and about 4 microns.

7. The method of claim 1, wherein said support and said gel are heated to a temperature between about 420 K and about 500 K and the gel comprises: 1.0 $Al_2O_3$: $aP_2O_5$: $bSiO_2$: cR: $dH_2O$ where R is a quaternary organic ammonium templating agent and
   a is between about 0.01 and about 52,
   b is between about 0.03 and about 196,
   c is between about 0.2 and about 5, and
   d is between about 20 and about 300.

8. The method of claim 7, where the SAPO is SAPO-34, R is tetra-ethyl ammonium hydroxide and
   a is about 1
   b is about 0.6
   c is about 1.07 and
   d is about 56.

9. The method of claim 1, wherein the gel is aged for more than 24 hours between about 290 K and about 300 K.

10. The method of claim 4, wherein the gel is aged for more than 24 hours between about 290 K and about 300 K.

11. The method of claim 10, wherein the gel is aged at least 48 hours between about 290 K and about 300 K.

12. The method of claim 1, wherein the porous support and gel are heated to a temperature between about 420 K and about 500 K.

13. The method of claim 12, wherein the porous support and gel are heated to a temperature between about 465 K and about 480 K.

14. The method of claim 1, further comprising repeating steps d) and e) at least once.

15. The method of claim 14, wherein steps b) and c) are repeated at least once.

16. The method of claim 14, wherein steps d) and e) are repeated until the SAPO layer is substantially impermeable to $N_2$ before performing step f).

17. The method of claim 16, wherein steps d) and e) are repeated at least twice.

18. The method of claim 1, further comprising washing and drying the support and the SAPO layer after step e).

19. A supported SAPO-34 membrane having a $CO_2/CH_4$ separation selectivity greater than about 60 at a temperature of about 297 K for an approximately equimolar $CO_2/CH_4$ mixture with about 222 kPa feed pressure and about 138 kPa pressure drop and made by the method comprising the steps of:
   a) providing a porous support;
   b) preparing an aqueous SAPO-34 forming gel comprising an organic templating agent:
   c) aging the gel;
   d) contacting the porous support with the aged gel;
   e) heating the porous support and the gel to form a layer of SAPO-34 crystals on the surface of the support; and f) calcining the SAPO-34 layer to remove the templating agent.

20. A supported membrane comprising a porous support and SAPO-34 crystals which are present within at least some of the pores of the support and which form a layer on at least one side of the support, and having a $CO_2/CH_4$ separation selectivity is greater than about 60 at a temperature of about 297 K for an approximately equimolar $CO_2/CH_4$ mixture with about 222 kPa feed pressure and about 138 kPa pressure drop.

21. The membrane of claim 20, wherein the thickness of the SAPO layer is less than about 20 microns.

22. The membrane of claim 20, wherein the porous support has an average pore size between about 0.2 micron and about 4 microns.

23. The membrane of claim 20, wherein the porous support is in the form of a tube and the SAPO crystals are present within the tube pores and form layers on both the inside and the outside of the tube.

24. The membrane of claim 23, wherein the thickness of the SAPO layer is less than about 20 microns.

25. The membrane of claim 23, wherein and the $CO_2/CH_4$ separation selectivity is greater than about 200 for an approximately equimolar $CO_2/CH_4$ mixture at about 250 K with a pressure differential across the membrane of about 3 MPa.

26. The membrane of claim 23, wherein for $CO_2/CH_4$ separation the $CO_2$ permeate concentration is greater than about 99% for an approximately equimolar $CO_2/CH_4$ mixture at about 250 K with a pressure differential across the membrane of about 3 MPa.

27. A method for separating a first gas component from a gas mixture containing at least a first and a second gas component, the method comprising the steps of:
   a) providing a membrane of claim 20, the membrane having a feed and a permeate side and being selectively permeable to the first gas component over the second gas component;
   b) applying a feed stream including the first and the second gas components to the feed side of the membrane;
   c) providing a driving force sufficient for permeation of the first gas component through the membrane, thereby producing a permeate stream enriched in the first gas component from the permeate side of the membrane.

28. The method of claim 27, wherein the membrane is a SAPO-34 membrane, first gas component is carbon dioxide and the second gas component is methane.

29. The method of claim 1, wherein the calcining temperature is between about 623 K and about 673 K.

30. The method of claim 1 wherein the support is a porous metal support.

31. The method of claim 5 wherein the gel does not completely fill the pores of the support.

32. A method for making a crystalline silicoaluminophosphate (SAPO) membrane, the method consisting essentially of the steps:
   a) providing a porous support;
   b) preparing an aqueous SAPO forming gel comprising an organic templating agent;
   c) aging the gel for more than 24 hours between about 290 K and about 300 K;
   d) contacting the porous support with the aged gel;
   e) heating the porous support and the gel to form a layer of SAPO crystals on the surface of the support;
   f) washing and drying the support and the SAPO layer; and
   g) calcining the SAPO layer to remove the templating agent,
wherein steps d) and e) are repeated until the SAPO layer is substantially impermeable to $N_2$ before performing step f) and when step d) is repeated the gel is contacted with the porous support and the previously formed layer of SAPO crystals.

33. A method for making a crystalline silicoaluminophosphate-34 (SAPO-34) membrane, the method comprising the steps of:
   a) providing a porous support having a pore size between about 0.2 and about 4.0 microns;
   b) preparing an aqueous SAPO-34 forming gel comprising an organic templating agent;
   c) aging the gel for at least 24 hours between about 290 K and about 300 K;
   d) contacting the porous support with the aged gel;
   e) heating the porous support and the gel to form a layer of SAPO-34 crystals on the surface of the support wherein the porous support and gel are heated to a temperature between about 465K and about 480 K;
   f) washing and drying the support and the SAPO-34 layer; and
   g) calcining the SAPO-34 layer to remove the templating agent,
wherein the calcining temperature is between about 623 K and about 673 K;
wherein steps d) and e) are repeated until the SAPO-34 layer is substantially impermeable to $N_2$ before performing step f) and when step d) is repeated the gel is contacted with the porous support and the previously formed layer of SAPO-34 crystals.

34. The membrane of claim 20 wherein the support is a porous metal support.

35. The membrane of claim 34 wherein the support is a stainless steel support.

36. The method of claim 33 wherein the gel is aged for more than 24 hours at a temperature between about 290 K and about 300K.

37. The method of claim 33 wherein the gel is aged for at least 48 hours at a temperature between about 290 K and about 300K.

* * * * *